Patented Aug. 22, 1933

1,923,286

UNITED STATES PATENT OFFICE 1,923,286

METHOD OF PURIFYING IRON FROM SULPHUR

Rutger Henrik von Seth, Avesta, and Bo Michael Sture Kalling, Djursholm, Sweden, assignors to A. Johnson & Co., Stockholm, Sweden, a firm of Sweden No Drawing. Application March 3, 1932, Serial No. 596,574, and in Sweden January 27, 1932

2 Claims. (Cl. 75—14)

In the reduction of iron, for instance in the manufacture of iron sponge according to the method proposed in U. S. application Serial No. 541,666, filed June 2, 1931, it often happens that the reduced iron contains sulphur combined with other metals; for instance the metals or metalloids contained in the gangue of the ore; or of metals or metal compounds added to the charge for the binding of sulphur or of metals which possibly in some form or other occurred in the ore; or of metals which may have occurred in the reducing agents, which agents may consist of coal or carbonaceous material in a solid state with liquid or gaseous materials suitable for the purpose or liquids or gases alone. The present invention has for its object a method to remove, from the iron formed, for instance iron sponge, or iron in a finely divided state, such sulphur compounds of other metals for instance Ca, Ba, Mg, by subjecting the finely divided iron or iron sponge, to a leaching and/or elutriating process by means of water.

In order to illustrate the invention the following examples are given.

There has been proposed a method of purifying iron from sulphur, consisting therein that the iron is heated without fusion in admixture with one or more metals or compounds of metals (such as Ca, Mg, Ba and others) which have a greater tendency to combine with sulphur than with iron, wherein, also, besides, one or more reducing agents may be added for the purpose of promoting this removal of sulphur from the iron, whereupon the iron is separated from the mixture. For economical and practical reasons lime (lime stone or burnt lime) may chiefly come into question as a sulphur binding substance. The greatest importance of the method lies in its application for purifying iron sponge from sulphur, which iron sponge has been produced either by reduction without fusion of an admixture of ore and sulphur containing carbon, or by reduction by means of reducing gases containing sulphur or compounds of sulphur.

In practising the method it has been found that the transference of the sulphur from the iron to the lime is very complete, so that the iron itself after having been heated contains only about 0.01% of sulphur or less, if it contained about 0.3% of sulphur before the heating with lime. However, it has been found difficult to free the iron sponge from sulphur to said degree due to the fact that the sulphur containing lime during the process penetrates into the pores of the very porous iron sponge so that said lime which is combined with or contains sulphur thereafter will be very difficult to separate from the iron, even when very finely ground. After heating an iron sponge, containing 0.3% of sulphur, with lime in a rolling furnace (rotating furnace) at the most suitable temperature and during the most suitable time the sulphur content of the iron sponge cannot be reduced beyond about 0.10 to 0.15% by means of the usual magnetic or mechanical separation, due to the above mentioned fact, although the iron itself does not contain more than 0.01% of sulphur or less.

According to the present invention a practically complete separation of the sulphur containing lime from the iron is effected by treating the iron sponge with water so that the sulphur containing lime is leached or elutriated. For obtaining a rapid and effective leaching of the lime it has been found suitable to heat the water. By such a method the S-content will be reduced in the above mentioned iron sponge to about 0.02 to 0.03%. Thereafter the iron sponge is dried in a suitable way, which can be done without oxidizing the iron sponge to any appreciable degree.

In order to attain as complete leaching and elutriation of the sulphur containing lime as possible it is generally necessary to crush the iron sponge heated with lime, so that it will be more fine-grained. It has been found suitable to carry out said crushing in water, for instance by wet grinding in a ball mill or tube mill whereby leaching and elutriation of the lime thus will take place simultaneously with the grinding. If the fine-crushing operation takes place in a dry condition prior to the treatment with water, a somewhat higher sulphur content in the iron sponge will be obtained, probably depending thereon that lime particles are worked into the iron sponge during the crushing operation so that they cannot be leached by the water. In certain cases it is advantageous first to subject the iron sponge to an elutriation and thereafter grind it finely in water.

By the elutriating process of the iron sponge with water a reduction of the sulphur content is caused also in another way. If produced by reduction without fusion by means of coal or carbon, containing sulphur, the porous sponge will always contain some carbon, which cannot be removed in a mechanical or magnetic way in a dry condition. Said carbon usually contains about 1% of sulphur, and therefore the presence of every per cent of carbon means an increase in the sulphur content of 0.01%. By the elutriation with water said carbon may be removed practically completely, whereby a corresponding decrease in the sulphur content of the iron sponge is attained.

Some of the sulphur content of the iron sponge may be combined also with such components which cannot be removed by a simple elutriation as is the case with the lime and the carbon. The original ore and therewith also the iron sponge may contain a gangue of such a kind that it binds some sulphur during the reduction, or the gangue or rock may also originally contain a certain amount of sulphur. During the heating of the iron sponge with lime some of the lime may, at the same time as it binds sulphur, also combine with the gangue, or with incompletely reduced iron oxides in the sponge and thereby form components, which cannot be released or elutriated by water in a simple way. The above mentioned sulphur containing components may suitably be separated by finely crushing the iron sponge in water, for instance by wet grinding in a ball mill or tube mill and a subsequent wet magnetic separation.

Having thus described our invention we declare that what we claim is:—

1. The improvement in the method of ridding finely divided iron of sulphur compounds contained therein, comprising treating the material with water in order to elutriate the sulphurous materials contained therein, the water for treating the iron being heated for the purpose of causing a rapid and effective washing out of lime.

2. The improvement in the method of ridding finely divided iron of sulphur compounds contained therein, comprising treating the material with water in order to elutriate the sulphurous materials contained therein, and subjecting the iron, subsequent to the initial treatment with water, to a fine-crushing operation in water.

RUTGER HENRIK VON SETH.
BO MICHAEL STURE KALLING.